US008798122B2

(12) United States Patent
Herbig

(10) Patent No.: US 8,798,122 B2
(45) Date of Patent: Aug. 5, 2014

(54) SYMBOL-TIMING RECOVERY TECHNIQUES FOR MULTI-BRANCH RECEIVERS

(75) Inventor: Gerhard Peter Herbig, Oppenweiler (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 299 days.

(21) Appl. No.: 13/139,743

(22) PCT Filed: Dec. 9, 2008

(86) PCT No.: PCT/EP2008/067137
§ 371 (c)(1),
(2), (4) Date: Dec. 5, 2011

(87) PCT Pub. No.: WO2010/066289
PCT Pub. Date: Jun. 17, 2010

(65) Prior Publication Data
US 2012/0069941 A1    Mar. 22, 2012

(51) Int. Cl.
*H04B 1/38* (2006.01)
*H03K 5/159* (2006.01)
*H04N 7/01* (2006.01)

(52) U.S. Cl.
USPC ............................. 375/222; 375/234; 348/465

(58) Field of Classification Search
USPC .................................. 375/222, 234; 348/465
See application file for complete search history.

(56) References Cited

U.S. PATENT DOCUMENTS

| 4,237,554 A | * | 12/1980 | Gitlin et al. | 375/234 |
| 4,455,661 A | * | 6/1984 | Qureshi | 375/222 |
| 4,689,805 A | * | 8/1987 | Pyhalammi et al. | 375/229 |
| 4,709,374 A | * | 11/1987 | Farrow | 375/231 |

(Continued)

FOREIGN PATENT DOCUMENTS

| DE | 3707763 C1 | 6/1988 |
| EP | 1458157 A1 | 9/2004 |

(Continued)

OTHER PUBLICATIONS

Guglielmi et al., "Blind Algorithms for Joint Clock Recovery and Baseband Combining in Digital Radio," European Conference on Radio Relay Systems, Oct. 11, 1993, pp. 279-286, vol. Conference 4, Edinburgh, Scotland.
Karasawa, Y. et al., "Cycle Slip in Clock Recovery on Frequency-Selective Fading Channels", IEEE Transactions on Communications, Mar. 1, 1997, pp. 376-383, vol. 45, issue 3, IEEE Communications Society.
Pellizzoni, R., et al., "A Single Chip M-QAM Long Haul modem, with embedded joint combination and cancellation", Seventh European Conference on fixed Radio Systems and Networks, Sep. 1, 2000, pp. 123-128, Dresden, Germany.

*Primary Examiner* — Leon-Viet Nguyen
*Assistant Examiner* — Sarah Hassan
(74) *Attorney, Agent, or Firm* — Coats & Bennett, P.L.L.C.

(57) ABSTRACT

A symbol-timing recovery function of a receiver is provided with a signal combiner (465) coupled to a first receive branch with a first receive signal (10) and to a second receive branch with a second receive signal (20). The signal combiner (465) generates a combined signal (C) on the basis of the first receive signal (10) and the second receive signal (20). Further, a common timing error detector (470C) is provided. The common timing error detector (470C) is coupled to the signal combiner (465) and is configured to generate a common timing error signal (TEC) on the basis of the combined signal. A first digital symbol timing for the first receive signal (10) and a second digital symbol timing for the second receive signal (20) are recovered on the basis of the common timing error signal (TEC).

10 Claims, 2 Drawing Sheets

(56) References Cited

U.S. PATENT DOCUMENTS

| | | | |
|---|---|---|---|
| 4,775,988 A * | 10/1988 | Chevillat et al. | 375/345 |
| 5,031,197 A | 7/1991 | Hespelt et al. | |
| 5,581,583 A | 12/1996 | Conti et al. | |
| 6,404,827 B1 * | 6/2002 | Uesugi | 375/340 |
| 6,710,811 B1 * | 3/2004 | Lin et al. | 348/465 |
| 6,870,892 B2 * | 3/2005 | Strolle et al. | 375/347 |
| 7,068,990 B1 | 6/2006 | Herbig | |
| 7,589,927 B2 * | 9/2009 | Hutchins et al. | 360/65 |
| 2002/0154690 A1 * | 10/2002 | Okazaki | 375/232 |
| 2002/0196844 A1 * | 12/2002 | Rafie et al. | 375/232 |
| 2003/0053534 A1 * | 3/2003 | Sivadas et al. | 375/229 |

FOREIGN PATENT DOCUMENTS

| | | |
|---|---|---|
| WO | 8807303 A1 | 9/1988 |
| WO | 98/12836 | 3/1998 |
| WO | 00077952 A1 | 12/2000 |
| WO | 02/075956 A1 | 9/2002 |

\* cited by examiner

100 # SYMBOL-TIMING RECOVERY TECHNIQUES FOR MULTI-BRANCH RECEIVERS

TECHNICAL FIELD

The present invention relates to symbol-timing recovery techniques for multi-branch receivers.

BACKGROUND

Radio transmission systems, e.g. long-haul radio transmission systems, may suffer from channel fading phenomena. For example, weather-related reflections or refractions cause multipath reception with severe signal distortions and dramatic loss of receive power. Such fading phenomena may also be referred to as "deep fading".

One known countermeasure against deep fading is diversity reception, in which receive signals of two antennas with different positions, i.e. signals from two receive branches, are combined. The careful choice of the antenna positioning may help to reduce deep fading on both receive branches at the same time.

Some diversity reception methods combine analogue signals from the two receive branches in an intermediate frequency range. Because only signals with equal transmission delays can be combined, delay compensation is accomplished before the signals are combined. The delay equalization may be implemented in the analogue domain using delay compensation cables with individually tailored lengths. However, in this case, an individual delay compensation cable needs to be configured and mounted for every radio station, which is time consuming and expensive.

Other diversity reception methods use digital combiners. In this case, fully-automatic delay equalization methods for digital signals are available. In a typical digital diversity combiner two adaptive filters are used, one in each of the receive branches. The adaptive filters are similar to an adaptive channel equalizer as used for non-diversity receivers. In the case of using digital combiners, the signal processing tasks of channel equalization and signal combination are joined together and can no longer be separated.

In a digitally implemented diversity receiver, a symbol timing recovery is needed for every analog-to-digital conversion. There are basically two alternatives. The first alternative is a "synchronous" sampling method, in which a physical clock is controlled with the aim to sample the input signals at the timing positions of the symbols. The second alternative is an "asynchronous" sampling method, in which the physical clock and the sampling of the input signal is free-running. In the latter case, the symbols may be recomputed from the input samples using interpolation filters.

In the first alternative, the physical clock may be controlled using a phase control loop in which a timing error detector is digital and an analog voltage controlled oscillator is used. Accordingly, in the first alternative, the phase control loop is partly digital and partly analog. In the second alternative, the symbol timing recovery may be fully digital and implemented in an ASIC ("Application Specific Integrated Circuit").

Irrespective of the choice of synchronous or asynchronous sampling, because different fading may occur on the two receive branches of a diversity receiver, it is known to provide an individual timing recovery function for each of the two receive signals.

However, in such a diversity receiver with digital combination and an individual symbol timing recovery for each receive branch, there may still be problems due to special fading phenomena, which produce cycle slips in the recovered symbol timing recovery.

A cycle slip is a recovery error, which is caused by a temporary loss of synchronization between a recovered clock signal and an input signal, from which the clock signal is to be recovered, due to a phase error between the recovered clock signal and the input signal being in excess of a full cycle. In other words, a clock recovery method typically estimates the sampling time of a received signal only with an ambiguity of an integer multiple of a symbol duration. After a deep fading event, the recovered sampling time may have shifted by one symbol duration as compared to the sampling time before the deep fading event, which is then referred to as a "cycle slip". In a digital diversity receiver, cycle slips adversely affect the common operation of the adaptive filters used for combining the receive signals.

Cycle slips can be seen as additionally introduced delays in the signal paths. There is a tendency of the cycle slips causing the adaptive filters to counteract these delays. This is undesirable, because due to their limited length the adaptive filters are only able to compensate a limited number of cycle slips. Moreover the performance of the adaptive filters degrades considerably after a cycle slip has occurred. Cycle slips may occur seldom, but every occurrence has significant consequences on the link transmission quality.

Accordingly, there is a need for improved techniques for symbol-timing recovery in a multi-branch receiver.

SUMMARY

According to an embodiment of the invention, a method of receiving data is provided. The method comprises receiving a transmit signal via a first antenna as a first receive signal and receiving the transmit signal via a second antenna as a second receive signal. A combined signal is generated on the basis of the first receive signal and the second receive signal, and a common timing error signal is generated on the basis of the combined signal. A first digital symbol timing for the first receive signal and a second digital symbol timing for the second receive signal are recovered on the basis of the common timing error signal.

According to a further embodiment of the invention, a receiver equipment is provided. The receiver equipment comprises a first receive branch for receiving a first receive signal and a second receive branch for receiving a second receive signal. In addition, the receiver equipment is provided with a signal combiner coupled to the first receive branch and to the second receive branch, the signal combiner being configured to generate a combined signal on the basis of the first receive signal and the second receive signal. Further, a common timing error detector is provided. The common timing error detector is coupled to the signal combiner and is configured to generate a common timing error signal on the basis of the combined signal. A first timing recovery function of the receiver equipment is configured to recover a first digital symbol timing for the first receive signal on the basis of the common timing error signal, and a second timing recovery function of the receiver equipment is configured to recover a second digital symbol timing for the second receive signal on the basis of the common timing error signal.

DETAILED DESCRIPTION OF EMBODIMENTS

In the following, the invention will be explained in more detail by referring to exemplary embodiments which relate to devices and methods for symbol-timing recovery in a multi-branch receiver configured as a diversity radio receiver. Nonetheless, it is to be understood, that the described concepts could also be applied in other types of multi-branch receivers.

According to the concepts as explained in the following, sampling of receive signals in both receive branches of a diversity radio receiver is based on the use of only one common timing phase. To evaluate the common timing phase, both receive signals are considered. The receive signals may be weighted by weight factors, which are dependent on the actual channel distortions of both transmission channels. For this purpose, a channel distortion detector may analyze the channel distortions in both receive branches.

Figure 1:
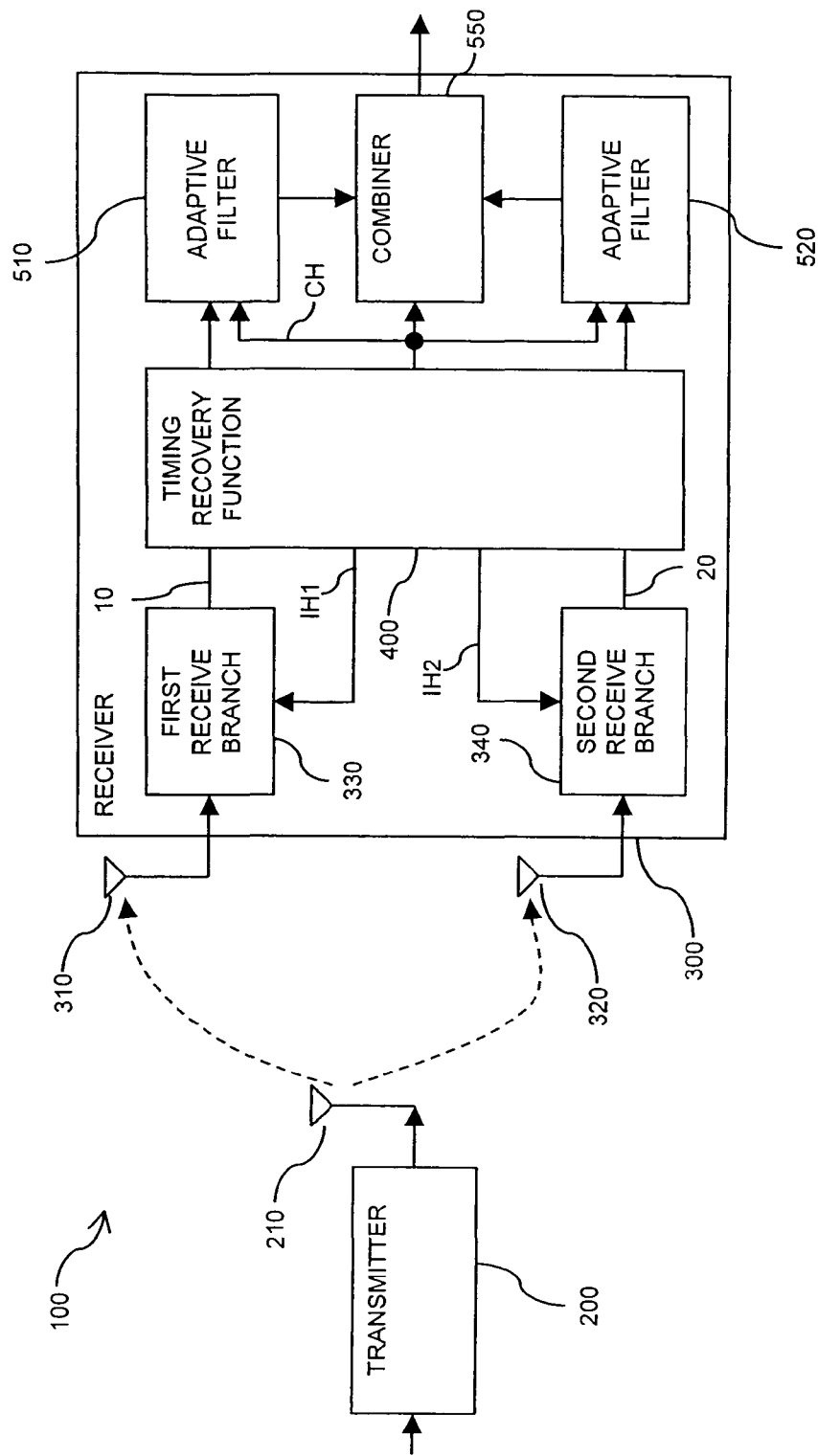
FIG. 1 schematically illustrates a communication system with a diversity radio receiver according to an embodiment of the invention.

FIG. 1 schematically illustrates communication system 100. The communication system 100 includes a transmitter 200 and a receiver 300. The receiver 300 is configured as a digitally implemented diversity radio receiver, and may thus also be referred to as digital diversity receiver.

The transmitter 200 is coupled to a transmit antenna 210. The receiver 300 is coupled to a first receive antenna 310 and to a second receive antenna 320. As illustrated by the dashed arrows, a transmit signal transmitted from the transmitter 200 is received in the receiver 300 via different signal paths or channels, one including the first receive antenna 310, the other including the second receive antenna 320.

In the receiver 300, the signal received via the first receive antenna 310 is supplied to a first receive branch 330. The signal received via the second receive antenna 320 is supplied to a second receive branch 340. The first and second receive branches 330, 340 may include receiving circuitry, such as tuners, amplifiers or the like. The first receive branch 330 provides a first receive signal 10, and the second receive branch 340 provides a second receive signal 20. Further, the first and second receive branches 330, 340 may also generate a common physical clock signal (not illustrated) which is used as a basis for processing the signals in the receiver 300.

The first and second receive signals 10, 20 are supplied to a common timing recovery function block 400 which accomplishes a symbol timing recovery for both receive signals 10, 20. That is to say, the common timing recovery function block provides a first timing recovery function for recovering a first digital symbol timing for the first receive signal 10 and a second timing recovery function for recovering a second digital symbol timing for the second receive signal 20. With the recovered symbol timing, the first and second receive signals are then supplied to a digital combiner 550 via respective adaptive filters 510, 520. The recovered symbol timing includes a sampling phase for digital symbols in the receive signal 10, 20. In the structure of FIG. 1, the recovered symbol timing includes a first individual hold signal IH1 for the first receive branch 330, a second individual hold signal IH2 for the second receive branch 340, and a common hold signal CH. The common hold signal CH is supplied to the adaptive filters 510, 520 and the combiner 550 to indicate the symbol timing of their input signals. The individual hold signals IH1, IH2, and the common hold signal CH will be further explained below.

Figure 2:
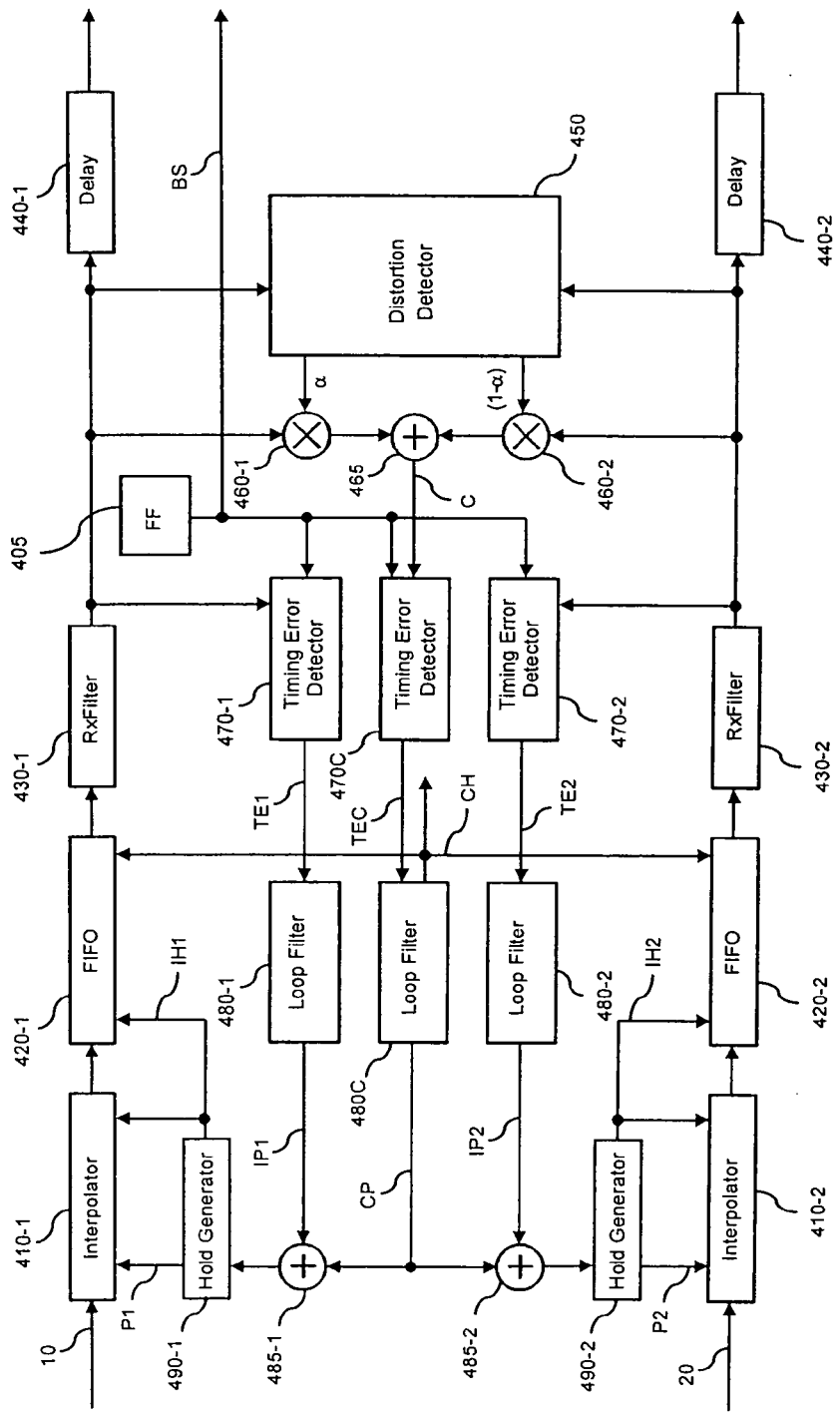
FIG. 2 schematically illustrates a timing recovery function block of the diversity receiver.

FIG. 2 schematically illustrates the structure and operations of the timing recovery function block 400 in the digital diversity receiver 300.

The timing recovery function 400 comprises a first branch corresponding to the first receive branch 330. The first branch comprises a first interpolator 410-1, a first elastic buffer store 420-1, a first matched receive (RX) filter 430-1, and a first delay line 440-1. The first receive signal 10 is received in the first interpolator 410-1 so as to be sampled and interpolated on the basis of a first input phase P1 and the first individual hold signal IH1. The sampled and interpolated first receive signal 10 is supplied from the first interpolator 410-1 to the first elastic buffer store 420-1 so as to be resampled on the basis of a common hold signal CH. The resampled first receive signal 10 is supplied from the first elastic buffer store 420-1 to the first receive filter 430-1. The filtered first receive 10 signal is supplied from the first receive filter 430-1 to the first delay line 440-1. The delayed first receive signal 10 is output from the first delay line 440-1 to the first adaptive filter 510 (FIG. 1).

Further, the timing recovery function block 400 comprises a second branch corresponding to the second receive branch 340. The second branch comprises a second interpolator 410-2, a second elastic buffer store 420-2, a second matched receive (RX) filter 430-2, and a second delay line 440-2. The second receive signal 20 is received in the second interpolator 410-2 so as to be sampled and interpolated on the basis of a second input phase P2 and the second individual hold signal IH2. The sampled and interpolated second receive signal 20 is supplied form the second interpolator 410-2 to the second elastic buffer store 420-2 so as to be resampled on the basis of the common hold signal CH. The resampled second receive signal 20 is supplied from the second elastic buffer store 420-2 to the second receive filter 430-2. The filtered second receive signal 20 is supplied from the second receive filter 430-2 to the second delay line 440-2. The delayed second receive signal 20 is output from the second delay line 440-2 to the second adaptive filter 520 (FIG. 1).

The input phase P1, P2 for the receive signal 10, 20 in each receive branch of the diversity receiver 300, i.e. the first input phase P1 and the second input phase P2, is the sum of a common part and an individual part.

The common part is generated by a common timing recovery loop from a weighted combination C of both receive signals 10, 20, with the aim to suppress timing information from strong fading channels. The common timing recovery loop comprises a first weighting node 460-1, a second weighting node 460-2, a summing node 465, a common timing error detector 470C, and a common loop filter 480C.

The first weighting node 460-1 is supplied with the output signal of the first receive filter 430-1. In the first weighting node 460-1, the first receive signal is weighted by a weight factor $\alpha$. The second weighting node 460-2 is supplied with the output signal of the second receive filter 430-2. In the second weighting node 460-2, the second receive signal is weighted by a weight factor $(1-\alpha)$. The summing node 465 is supplied with the output signals of the first weighting node 460-1 and of the second weighting node 460-2. In the summing node 465, the output signals of the weighting nodes 460-1, 460-2 are summed so as to generate the weighted combination C of the receive signals 10, 20. The common timing error detector 470C is supplied with the output signal of the summing node 465, i.e. with the weighted combination C of the first and second receive signals 10, 20. The common timing error detector 470C generates a common timing error signal TEC. The common timing error signal TEC is supplied to the common loop filter 480C which outputs a common phase value CP. In this structure, the common timing error detector 470C generates the common timing error signal TEC on the basis of a combined signal, i.e. the weighted combination C of the first and second receive signals 10, 20.

The individual parts are generated by a first individual timing recovery loop and a second individual timing recovery loop from only the first receive signal 10 and only the second receive signal 20, respectively, with the aim to equalize static delay differences in the two receive branches, for example, due to different lengths of antenna feeders.

The first individual timing recovery loop comprises a first individual timing error detector 470-1, a first individual loop filter 480-1, and a first loop summing node 485-1. The first individual timing error detector 470-1 is supplied with the output signal of the first receive filter 430-1, i.e. the filtered first receive signal 10. The first individual timing error detector 470-1 generates a first individual timing error signal TE1, which is supplied to the first individual loop filter 480-1. The output of the first individual loop filter 480-1 is a first individual phase value IP1. In the first loop summing node 485-1, the first individual phase value IP1 and the common phase value CP are summed so as to generate the input phase P1 for the first interpolator 410-1.

The second individual timing recovery loop comprises a second individual timing error detector 470-2, a second individual loop filter 480-2, and a second loop summing node 485-2. The second individual timing error detector 470-2 is supplied with the output signal of the second receive filter 430-2, i.e. the filtered second receive signal 20. The second individual timing error detector 470-2 generates a second individual timing error signal, which is supplied to the second individual loop filter 480-2. The output of the first individual loop filter 480-2 is a second individual phase value IP2. In the second loop summing node 485-2, the second individual phase value IP2 and the common phase value CP are summed so as to generate the input phase P2 for the second interpolator 410-2.

Further, the timing recovery function comprises a flip-flop block 405 and a distortion detector 450.

The flip-flop block 405 produces a digital bit sequence BS of alternating values "0" and "1" with an arbitrary start. The bit sequence BS is supposed to indicate the symbol samples (e.g. by the value "0") and the in-between symbol samples (e.g. by the value "1"). This indication is used by the adaptive filters 510, 520, to which the receive signals 10, 20 with the recovered symbol timing are supplied. The bit sequence BS is also supplied to the common timing error detector 470C, the first individual timing error detector 480-1, and the second individual timing error detector 480-2, which take care that the indication of symbol samples and in-between symbol samples is correct. That is to say, the common timing recovery loop and the individual timing recovery loops control the recovered symbol timing in such a way that the sequence correctly indicates symbol samples and in-between symbol samples.

The distortion detector 450 is supplied with the output signal of the first receive filter 430-1 so as to detect a first distortion level in the first receive signal 10, and with the output signal of the second receive filter 430-2 so as to detect a second distortion level in the second receive signal 20. The distortion levels may be detected as amplitude distortions and/or as phase distortions. The distortion detector 450 generates the weight factor α for the first weighting node 460-1 and the weight factor (1−α) for the second weighting node 460-2 on the basis of the detected first distortion level and the detected second distortion level. The distortion detector 450 is configured to generate the weight factors α and (1−α) so as to assure that, e.g. in the case of a cycle slip in one of the receive branches only the signal from the other, non-fading, receive branch is used for the timing error detection. That is to say, if a high level of distortion is detected for one of the receive signals, the corresponding weight factor is reduced, whereas the other weight factor is increased. In this way, if there is a high distortion level in one of the receive signals 10, 20, and a low distortion level in the other receive signal 10, 20, the weight factor of the receive signal 10, 20 with the weaker distortion level will be larger, thereby reducing the influence of the distorted receive signal 10, 20 on the timing recovery process.

Because cycle slips correspond to very deep notches at the transmission spectrum centre, the distortion detector 450 may be adapted to detect notches at the transmission spectrum centre. As in-band notches normally follow spectrum slopes and also are followed by spectrum slopes, the distortion detector 450 may be configured as a combination of high-pass-filters, low-pass-filters and slope detectors. The distortion detector 450 may be further optimized to detect notches in the transmission spectrum.

Due to their nature, in-band notches enhance the relative power of the transmission spectrum edges, where timing error detectors normally get their information from.

Therefore, without countermeasure, the unwanted timing error information is typically stronger than the wanted information. Accordingly, the diversity receiver may also include means for actively suppressing the unwanted information.

Using the first and second individual timing recovery loops, static delays up to +/−½ symbol duration may be equalized, assuming that the symbol timing recovery operates modulo one symbol duration. To equalize higher delay differences, the delay lines 440-1, 440-2, which may be programmed with fixed settings, are inserted into the signal path after the interpolation filters 410-1, 410-2. Optimized settings for the delay lines 440-1, 440-2 may be obtained on the basis of simple correlation methods.

The whole arbitrary delay difference between the receive branches can be separated into an integer part, i.e. the number of symbol durations, and into a fractional part, i.e. the rest. The integer part may be equalized by the delay lines 440-1, 440-2, and the fractional part by the first and second individual timing recovery loops.

The fractional part of the delay is equalized before the integer part. Again assuming that the timing error detectors 470-1, 470-2 operate on a modulo basis, this allows a very simple and robust architecture: The fractional part equalization can be accomplished with a random setting of the integer part, and the integer part can be estimated without any influence on the fractional part.

The fractional delay equalization and the generation of the received digital symbols is accomplished by the same device, i.e. the interpolation filters 410-1, 410-2. Examples for suitable interpolation filters are known from existing asynchronous sampling systems.

In the following the operation of the timing recovery function block 400 will be explained in more detail.

The data at the input of the interpolation filters 410-1, 410-2 are sampled at a rate which typically is somewhat higher than the doubled symbol rate of the receive signal. The interpolation filters 410-1, 410-2 are configured to downsample the data and produce samples with exactly the doubled symbol rate.

For every input data symbol, the interpolation filters 410-1, 410-2 need a sampling phase for making the interpolation. The sampling phase is provided by the input phases P1, P2 generated by the first and second loop summing nodes 485-1, 485-2. Because there are less output data than input data, there are holes in the output data stream of the interpolators 410-1, 410-2, the sequence of valid data symbols between the holes being indicated by a hold signal. As both interpolation filters may operate on different phases, they are supplied with different hold signals, i.e. the first and second individual hold signals IH1, IH2. The first individual hold signal IH1 for the first interpolator 410-1 is generated by a hold generator 490-1, and the second individual hold signal IH1 for the second interpolator 410-2 is generated by a second hold generator 490-2.

In the digitally implemented timing recovery loops, the hold generators 490-1, 490-2 function as a number controlled oscillator (NCO).

For a common operation on both receive signals in the distortion detector 450 or in the summing node 465 at the input of the common timing error detector 470C, both receive signals are converted to have identical hold signals, i.e. the hold sequence of the receive signals is changed before supplying them to the distortion detector 450 or to the summing node 465. This is accomplished with the elastic buffer stores 420-1, 420-2, which may be implemented on the basis of FIFO-buffers (FIFO: "First In/First Out"), which both operate on the basis of different input hold sequences but identical output hold sequences. That is to say, the input of the first elastic buffer store 420-1 operates on the basis of the first individual hold signal IH1, and the output of the first elastic buffer store 420-1 operates on the basis of the common hold signal CH. Similarly, the input of the second elastic buffer store 420-2 operates on the basis of the second individual hold signal IH2, and the output of the second elastic buffer store 420-2 operates on the basis of the common hold signal CH. The common hold signal CH is generated by the common loop filter 480C.

The respective output signals of the elastic buffer stores 420-1, 420-2 are supplied to the corresponding receive filter 430-1, 430-2 so as to shape the signal spectrum form, e.g. to reduce inter-symbol interference in the system or suppress spectrum trails from adjacent transmission channels.

The respective output signals of the receive filters 430-1, 430-2 are analyzed in the distortion detector 450 so as to identify notches in the signal spectrum. This may be accomplished by a combination of low-pass filters, high-pass filters and slope detectors. As an output of the distortion detector 450, the weight factors $\alpha$ and $(1-\alpha)$ are generated, which are used for obtaining the weighted combination of the receive signals to be input into the common timing error detector 470C.

As mentioned above, the timing recovery function further includes the first individual timing error detector 470-1 and the second individual timing error detector 470-2, the first individual timing error detector 470-1 operating only on the receive signal of the first receive branch, and the second individual timing error detector 470-2 operating only on the receive signal of the second receive branch.

The common timing error detector 470C, the first individual timing error detector 470-1, and the second individual timing error detector 470-2 supply their output signals to the respective loop filters 480C, 480-1, 480-2. That is to say, the common timing error detector supplies its output signal to the common loop filter 480C, the first individual timing error detector supplies 480-1 its output signal to first individual loop filter 480-1, and the second individual timing error detector 470-2 supplies its output signal to the second individual loop filter 480-2.

The loop filters 480C, 480-1, 480-2 operate at the input clock rate, i.e. the clock rate of the interpolators 410-1, 410-2, and each output a respective phase value, i.e. the common phase value CP, the first individual phase value IP1 and the second individual phase value IP2. The phase values CP, IP1, IP2 are output at every clock edge. As compared to the output signals of the interpolation filters 410-1, 410-2, the phase values CP, IP1, IP2 are not accompanied by hold signals.

The phase values CP, IP1 from the common loop filter 480C and the first individual loop filter 480-1 are combined, by the first loop summing node 485-1, to calculate the input phase P1 for the first interpolation filter 480-1, and the phase values CP, IP2 from the common loop filter 480C and from the second individual loop filter 480-2 are combined, by the second loop summing node 485-2, to calculate the input phase P2 for the second interpolation filter 410-2.

The first individual hold signal IH1 is generated by the first hold generator 490-1 from the combined phase values of the common loop filter 480C and the first individual loop filter 480-1, and the second individual hold signal IH2 is generated by the second hold generator 490-2 from the combined phase values of the common loop filter 480C and the second individual loop filter 480-2.

In the illustrated structure, the first and second hold generators 490-1, 490-2 are implemented as separate components, the first hold signal generator 490-1 receiving the combined phase value from the first loop summing node 485-1, and the second hold signal generator 490-2 receiving the combined phase value from the second loop summing node 485-2. The hold generators 490-1, 490-2 are configured to produce the respective individual hold signal in response to the respective combined phase values passing a value of $2\pi$. By using the combined phase values as a basis for generating the individual hold signals IH1, IH2, the phase offset from the individual timing recovery loops can be taken into account in the process of generating the individual hold signals IH1, IH2.

The first individual loop filter 480-1 and the second individual loop filter 480-2, i.e. the two loop filters of the individual timing recovery loops, are dimensioned with a large time constant. As the individual timing recovery loops have the purpose of estimating and equalizing static delays, their time constants should be significantly larger than typical fading events. For example time constants of one minute or even larger may be used. In a typical implementation, time constants in the range of several minutes may be used. The symbol timing phase, i.e. the input phase P1, for the first receive signal 10 is thus quasi-statically controlled on the basis of the first individual timing error signal TE1. Similarly, the symbol timing phase, i.e. the input phase P2, for the second receive signal 20 is thus quasi-statically controlled on the basis of the second individual timing error signal TE2.

It should be noted that in the individual timing recovery loops it is sufficient to perform a phase estimation and a frequency estimation is not needed.

The common loop filter 480C is dimensioned with a shorter time constant, e.g. with a bandwidth of about $10^{-4}$ normalized to the symbol rate. Both symbol timing phases, i.e. the input phase P1, P2, for the first and second receive signals 10, 20 are thus dynamically controlled on the basis of the common timing error signal TEC.

Accordingly, the first and second loop summing nodes 485-1, 485-2, which receive the output of the common loop filter 480C, each add a fast varying phase value to a substantially constant or only slowly varying phase offset received from the corresponding individual loop filter 480-1, 480-2. The output signals of the two loop summing nodes 485-1, 485-2 are used as the input phases for the interpolation filters 410-1, 410-2.

In the above structure of the symbol timing recovery function, the common phase value is evaluated on the basis of the distortion-dependent combination of signals from the receive branches. In the common phase value, the influence of fading phenomena, in particular of cycle slips, is suppressed. In this way, the influence of various types of fading phenomena, including cycle slips, on the recovered input phase of the interpolators 410-1, 410-2 may be significantly reduced or even completely suppressed.

It is to be understood that the above concepts and examples are merely illustrative and are susceptible to various modifications. For example, the timing recovery block could be implemented with only the common timing recovery loop or with a combination of the common timing recovery loop with only one of the individual timing recovery loops. Further, the above concepts can be applied to various types of multi-branch receivers, including polarization diversity receivers or frequency diversity receivers. That is to say, the receive signals of the different branches may have been transmitted using different polarizations and/or frequencies. A diversity transmission scheme may be applied at the transmitter. Further, the number of receive branches is not limited to two. Additional receive branches and corresponding individual timing recovery loops may be provided as appropriate.

The invention claimed is:

1. A method of receiving data, comprising:
 receiving a transmit signal via a first antenna as a first receive signal;
 receiving the transmit signal via a second antenna as a second receive signal;
 generating a combined signal on the basis of the first receive signal and the second receive signal;
 generating a common timing error signal on the basis of the combined signal;
 generating a first individual timing error signal on the basis of the first receive signal;
 generating a second individual timing error signal on the basis of the second receive signal;
 recovering a first digital symbol timing for the first receive signal on the basis of the common timing error signal and the first individual timing error signal; and
 recovering a second digital symbol timing for the second receive signal on the basis of the common timing error signal and the second individual timing error signal;
 wherein the common timing error signal is filtered to generate a common phase value,
 wherein the first individual timing error signal is filtered to generate a first individual phase value,
 wherein the second individual timing error signal is filtered to generate a second individual phase value,
 wherein the common phase value and the first individual phase value are combined to generate a symbol timing phase for the first receive signal,
 wherein the common phase value and the second individual phase value are combined to generate a symbol timing phase for the second receive signal, and
 wherein the symbol timing phase for the first receive signal is quasistatically controlled on the basis of the first individual timing error signal, and the symbol timing phase for the first receive signal and the symbol timing phase for the second receive signal are dynamically controlled on the basis of the common timing error signal.

2. The method according to claim 1, further comprising:
 sampling the first receive signal on the basis of the recovered first digital symbol timing; and
 sampling the second receive signal on the basis of the recovered second digital symbol timing;
 wherein generating the combined signals comprises generating the combined signal on the basis of the sampled first and second receive signals.

3. The method according to claim 2, further comprising:
 synchronizing the sampled first receive signal and the sampled second receive signal on the basis of a common hold signal, the common hold signal indicating positions of valid data symbols in the sampled first receive signal and the sampled second receive signal.

4. The method according to claim 1, wherein the symbol timing phase for the second receive signal is quasistatically controlled on the basis of the second individual timing error signal.

5. The method according to claim 1, wherein generating the combined signal comprises:
 detecting a first distortion level in the first receive signal;
 detecting a second distortion level in the second receive signal;
 obtaining a first weight factor and a second weight factor on the basis of the detected first distortion level and the detected second distortion level, respectively; and
 generating the combined signal on the basis of the first receive signal, which is weighted by the first weight factor, and the second receive signal which is weighted by the second weight factor.

6. A receiver equipment, comprising:
 a first receive branch for receiving a first receive signal;
 a second receive branch for receiving a second receive signal;
 a signal combiner coupled to the first receive branch and to the second receive branch, the signal combiner being configured to generate a combined signal on the basis of the first receive signal and the second receive signal;
 a common timing error detector coupled to the signal combiner, the common timing error detector being configured to generate a common timing error signal on the basis of the combined signal;
 a first individual timing error detector coupled to the first receive branch, the first individual timing error detector being configured to generate a first individual timing error signal on the basis of the first receive signal;
 a second individual timing error detector coupled to the second receive branch, the second individual timing error detector being configured to generate a second individual timing error signal on the basis of the second receive signal;
 a first timing recovery function configured to recover a first digital symbol timing for the first receive signal on the basis of the common timing error signal and the first individual timing error signal; and
 a second timing recovery function configured to recover a second digital symbol timing for the second receive signal on the basis of the common timing error signal and the second individual timing error signal,
 wherein the first timing recovery function and the second timing recovery function comprise a common loop filter configured to generate a common phase value on the basis of the common timing error signal,
 wherein the first timing recovery function further comprises:
 a first individual loop filter configured to generate a first individual phase value on the basis of the first individual timing error signal; and
 a first combiner configured to combine the common phase value and the first individual phase value to generate a symbol timing phase for the first receive signal, wherein the second timing recovery function comprises:
a second individual loop filter configured to generate a second individual phase value on the basis of the second individual timing error signal; and
a second combiner configured to combine the common phase value and the second individual phase value to generate a symbol timing phase for the second receive signal, and wherein the first timing recovery function is configured to quasistatically control the symbol timing phase for the first receive signal on the basis of the first individual timing error signal, and wherein the first and second timing recovery functions are respectively configured to dynamically control the symbol timing phase for the first receive signal and the symbol timing phase for the second receive signal on the basis of the common timing error signal.

7. The receiver equipment according to claim 6, wherein:
the first receiver branch comprises a first interpolator configured to sample the first receive signal on the basis of the recovered first digital symbol timing;
the second receiver branch comprises a second interpolator configured to sample the second receive signal on the basis of the recovered second digital symbol timing; and
the signal combiner generates the combined signal on the basis of the sampled first and second receive signals.

8. The receiver equipment according to 7, wherein:
the first receiver branch further comprises a first elastic buffer store configured to synchronize the sampled first receive signal on the basis of a common hold signal, the common hold signal indicating positions of valid data symbols in the sampled first receive signal and the sampled second receive signal; and
the second receiver branch further comprises a second elastic buffer store configured to synchronize the sampled second receive signal on the basis of the common hold signal.

9. The receiver equipment according to claim 6, wherein the second timing recovery function is further configured to quasistatically control the symbol timing phase for the second receive signal on the basis of the second individual timing error signal.

10. The receiver equipment according to claim 6, wherein the signal combiner comprises:
a distortion detector configured to
detect a first distortion level in the first receive signal;
detect a second distortion level in the second receive signal;
obtain a first weight factor and a second weight factor on the basis of the detected first distortion level and the detected second distortion level, respectively;
a first weighting node configured to weight the first receive signal by the first weight factor to generate a first weighted signal;
a second weighting node configured to weight the second receive signal by the second weight factor to generate a second weighted signal; and
a summing node configured to combine the first and second weighted signals to generate the combined signal.

\* \* \* \* \*